March 23, 1965 C. L. BARCIA ET AL 3,174,645

EJECTOR DEVICE

Filed Aug. 30, 1962 2 Sheets-Sheet 1

INVENTORS
CASPER L. BARCIA
HENRI A. KHOURY

BY Ronald J. Kransdorf

AGENT

United States Patent Office 3,174,645
Patented Mar. 23, 1965

3,174,645
EJECTOR DEVICE

Casper L. Barcia, Briarcliff Manor, and Henri A. Khoury, Yorktown Heights, N.Y., assignors to International Business Machines Corporation, New York, N.Y., a corporation of New York Filed Aug. 30, 1962, Ser. No. 220,453
12 Claims. (Cl. 221—88)

This invention relates to ejector devices and more particularly to an ejector device which is capable of pneumatically ejecting thin flexible members without causing instability thereof.

One problem which presently is plaguing the government and large businesses is that of storing large volumes of information and of being able to retrieve a desired bit of this information rapidly and at low cost. One method of achieving large volume storage is to record the information to be stored on thin record members such as photographic film chips, photographic discs, or magnetic discs and then storing the record members in addressable bins. With memories of this type, high speed selection and transport of a desired record member to a reading or writing station becomes a problem. Present systems have performed these functions by mechanically moving an arm to the bin where the desired record is stored, picking the record out with a finger-like mechanism, mechanically moving the arm with the attached record to a utilization station, and reversing the above operations to return a record to its storage bin. These systems have proved to be relatively slow, cumbersome, and expensive. It has been found that greater speed and simplicity and reduced cost can be achieved by using pneumatic transport systems similar to that described in copending application Serial No. 217,185 (IBM Docket 10,597), filed August 15, 1962, on behalf of C. L. Barcia and assigned to the assignee of the instant application.

In the system described in the above identified application, a record member is ejected from a storage bin by applying air pressure to its rear surface. It has been found that when air is blown across the surfaces of a thin member, it causes instability or vibration of the member. This effect is similar to that which causes a flag or a sail to flap in a breeze. It has been experimentally determined that the threshold pressure at which this instability starts is inversely proportional to the square of the thickness of the member.

In the storage applications mentioned above, plastic film strips having a thickness of as little as 5 mils have been employed. A film of this thickness is very flexible and instability occurs with a relatively low velocity air flow across the faces of the member. Since the air velocity is proportional to its pressure, this, in effect, reduces the drive pressure which can be applied to the member. When instability does occur, the vibration of the film causes it to bind against the surfaces of the bin causing the member to hang in the bin rather than to be ejected. If the vibrations become severe enough, it may also cause the photographic or magnetic recording media on the face of the member to be shaken off or even cause destruction of the plastic film itself.

It is therefore a primary object of this invention to provide means for pneumatically ejecting a flexible member without causing instability or vibration thereof.

A more specific object of this invention is to provide means for pneumatically ejecting a flexible member without causing appreciable air flow across the faces thereof.

A still more specific object of this invention is to provide an ejection chamber in which at least part of a flexible record member may be stored and to which air pressure may be applied to eject the member without causing appreciable air flow across the faces of the member.

A further object of this invention is to provide means for applying a step-function pressure pulse to the rear of flexible member, which pressure pulse causes instantaneous ejection of the member.

A still further object of this invention is to provide means for ejecting a flexible member from a storage chamber and for returning the member to the chamber without the need for any external drive means.

In accordance with these objects this invention provides an ejection station in which a flexible member to be ejected is initially positioned. The rear portion of this ejection station is an ejection chamber the upper and lower surfaces of which are separated by a distance which is infinitesimally greater than the thickness of the member. When the flexible member is properly positioned for ejection, its rear faces are closely fitted between the upper and lower surfaces of the ejection chamber. Means are provided for applying gas pressure to the rear of the ejection chamber to cause the member closely fitted therein to be blasted out. The means for applying gas pressure to the rear of the ejection chamber is generally also adapted to apply vacuum to the chamber to restore a member to the proper position before the next ejection cycle.

The foregoing and other objects, features and advantages of the invention will be apparent from the following more particular description of preferred embodiments of the invention, as illustrated in the accompanying drawings.

Figures 1, 2:
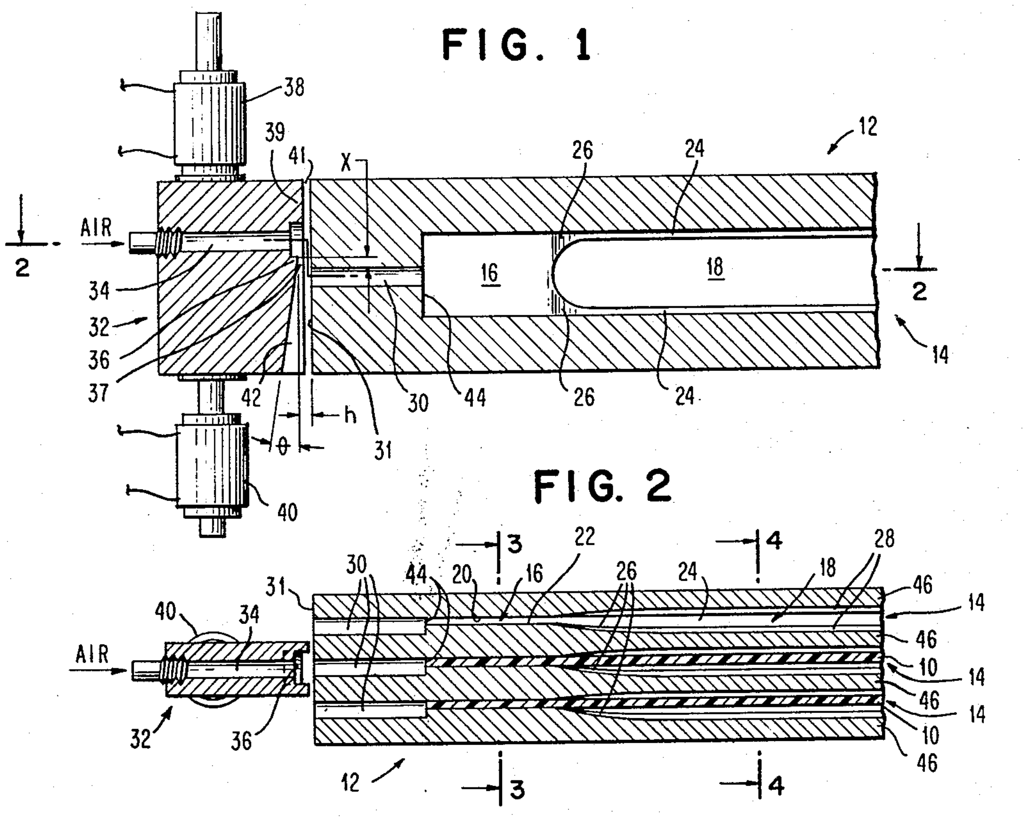
FIG. 1 is a top sectional view of a preferred embodiment of the ejection device of this invention.
FIG. 2 is a sectional elevation of the ejection device of this invention taken along the line 2—2 in FIG. 1.
Figure 3:
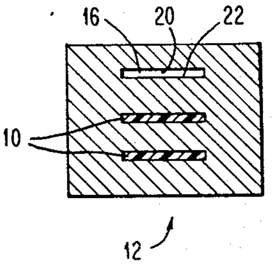
FIG. 3 is a sectional side view of the ejection device of this invention taken along the line 3—3 in FIG. 2.

FIGS. 1–4 show an ejection device for ejecting rectangular strips 10 one at a time from a storage bin 12. The storage bin 12 contains a plurality of these strips positioned one on top of the other in chambers 14 of bin 12. Each chamber 14 is divided into two distinct portions, a rear, restricted portion 16 and a forward portion 18. The rear portion 16 has upper and lower surfaces 20 and 22 respectively which are separated from each other by a distance which is infinitesimally greater than the thickness of a strip 10. For a 5-mil thick strip 10, a suitable separation of the upper and lower surfaces of restricted portion 16 is 6 mils. As can be seen from FIG. 3, the width of portion 16 is also substantially the same as that of strip 10, being greater than the width of the strip by only an infinitesimal amount.

The forward portion 18 is of sufficient length to include the remainder of the strip 10. Two channels or tracks 24 form the outer edges of this portion. The separation of the upper and lower surfaces of these tracks is somewhat greater than the separation in the portion 16 so that the strip may move freely therein. The width of these tracks 24 is a small fraction of the total width of the strip. For a strip 0.63 inch wide and 5 mils thick, a track width 1/10 that of the strip (i.e. 0.06 inch) was found to be adequate to provide the required support. No information is recorded on the areas of the strips resting in portion 16 or in track 24. Since the thickness of tracks 24 is greater than that of portion 16, a tapered portion 26 is provided between portions 16 and 18, as shown in FIG. 2, to effect a transition.

In FIG. 2 the track-portion 24 of the chamber has been shown as tapering away from the portion 16 only at the lower surface of the chamber. This has been done merely for the sake of illustration. The increased thickness of the track may also be effected by having the taper only along the upper surface, or equally along both surfaces to achieve a mouth-like effect. The only requirement is that the strip not encounter a sharp corner at the transition point since this might cause the strip to catch and buckle.

Figure 4:
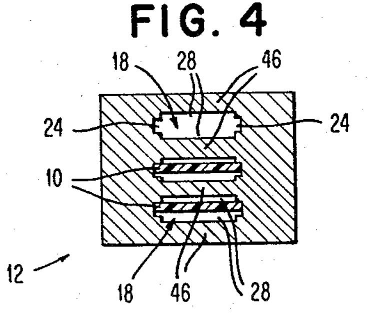
FIG. 4 is a sectional side view of the ejection device of this invention taken along the line 4—4 in FIG. 2.

The center of portion 18 tapers away from portion 16 more sharply than the tracks of this chamber-portion and tapers away at both the top and bottom surfaces. This tapered portion is slightly curved so as not to present any sharp edges to the center of an incoming strip, which may sag in this unsupported area. The center portion 18 forms two grooves 28 (as shown in FIG. 4) the maximum depth of which is not critical but the minimum depth of which is. The reason for this criticality will be explained later. These grooves also provide room for the strip to sag or even vibrate slightly without contacting the surfaces of the grooves 28 in the area of the strip where information is recorded and in this way protects the information stored on the strip.

A channel 30 connects the rear of each chamber 14 to the back surface 31 of bin 12.

An air gun 32 is positioned behind bin 12. This gun may be movable so that it may be positioned behind the channel 30 for the chamber 14 in which the record strip which it is desired to eject is positioned; but preferably, the position of the gun is fixed in the vertical plane and the bin 12 is movable in this plane to position the proper channel 30 in line with the air gun. The air gun has a channel 34 bored therethrough which channel has air pressure continuously applied thereto from a source of air pressure (not shown).

The front surface of this air gun has a projection 36 formed therein at a point somewhat below (as viewed in FIG. 1) air channel 34, and the front surface of the gun tapers away from this projection at an angle $\theta$. A throat 37 having a width $h$ is formed between projection 36 and the rear surface 31 of bin 12. There is also a projection 39 formed on the face of the gun at the point above channel 34. The throat 41 formed between this projection and bin 12 has a width much less than $h$. Air gun 32 is normally positioned as shown in FIG. 1 with solenoid 38 energized and solenoid 40 deenergized. When air gun 32 is positioned in this way, a small amount of the air applied to channel 34 leaks off through throat 41, but most of the air applied to channel 34 flows through the less constricting throat 37 and diffuser area 42, passing the mouth of channel 30 as it does so. This air flow creates a vacuum in channel 30, restricted portion 16, and, to a somewhat lesser extent, in forward portion 18. By suitable selection of the diffuser angle $\theta$, the width of throat 37, and the distance $x$ of the throat from the mouth of channel 30, an extremely high vacuum is obtained in the channel 30. With an angle $\theta$ of 12.5° a throat width $h$ of 12 mils, a distance $x$ of about 120 mils and an applied air pressure of 60 p.s.i., a vacuum of 22 inches of Hg was obtained.

Air pressure is applied to the channel 30 by deenergizing solenoid 38 and energizing solenoid 40 causing air gun 32 to move down a sufficient amount to align channel 34 with channel 30. This method of shifting from air pressure to vacuum and back again has the advantage that no time lag exists in building up an air pressure in the air gun and the channels connecting to it. Once the solenoid 40 is energized the full air pressure from the pressure source is applied almost instantaneously to channel 30. The resulting step function pressure pulse gives forceful ejection from chamber 14 which would not be obtained with a gradual pressure build-up. However, the invention is not limited to the disclosed method of obtaining a vacuum or applying pressure and other suitable means may be employed.

*Operation*

In operation, air gun 32 is initially positioned as shown in FIG. 1 with solenoid 38 energized and solenoid 40 deenergized. With air gun 32 in this position, a vacuum is developed in channel 30 and in restricted portion 16, as previously indicated. A partial vacuum is also caused in chamber portion 18. This vacuum draws a strip 10 which is partially inserted into chamber 14 into restricted portion 16. The strip is forced between close-fitted faces 20 and 22, being slowed down by the friction thus developed, and finally brought to a stop against the rear surface 44 of the chamber. The end of strip 10 is not damaged by the impact because it is constrained too closely in portion 16 to permit buckling. The vacuum applied to the strip through channel 30 keeps it from rebounding when it hits surface 44, or, if a slight rebound does occur, restores the member to the proper position. A record member is, in this manner, properly positioned in the ejection station.

To eject the strip 10 positioned in the chamber 14 in front of air gun 32, solenoid 40 is energized and solenoid 30 deenergized to bring air channel 34 into alignment with channel 30. This causes air pressure to be applied to the rear surface of the strip. The pressure fit in portion 16 is tight enough to prevent substantial air leakage over the faces of and around the edges of the strip, thus causing a considerable static air pressure to be developed behind the record member. This static pressure is reinforced by the dynamic air pressure of the air flow applied by air gun 32. The combined effects of these two pressures results in a piston-cylinder-like action which causes strip 10 to be blasted out from chamber portion 16 with a very high initial velocity. The velocity of the strip as it leaves portion 16 is great enough so that there is little if any relative velocity between the strip and the air flowing over it. Any slight relative velocity is insufficient to cause instability of the strip. Experimental results have shown that, with the five-mil strips and other parameters previously mentioned, the strip achieves a velocity of 400 inches/sec. in a time interval which can be considered instantaneous (i.e. less than 10 milliseconds).

Two dimensions of the chamber 14 are critical for the proper operation of the ejector. The first of these dimensions is the spacing between the surfaces 20 and 22 of restricted portion 16. If this spacing is too large, air will escape over the faces of the strip causing vibration of the strip and ejection will either not occur or will occur at an extremely low rate. For a 5 mil strip, and 60 p.s.i. applied pressure, a spacing of these surfaces of from 5.5 to 7.5 mils has been found to be satisfactory with better results being obtained for the smaller spacings. If the spacing is too small, however, it is difficult to draw the strip into restricted portion 16. A spacing of 6 mils has been found to be an acceptable compromise.

The other critical dimension is the minimum depth of grooves 28. As mentioned previously, the depth of these grooves may be as great as desired and the greater this depth, the less likelihood there is of vibration and instability in the film strip. But for the fact that it is desired to store other strips in chambers above and below a given chamber, the groove walls 46 could be eliminated entirely exposing the upper and lower faces of the strip to atmospheric pressure in all parts of the strip except that part fitted in portion 16 and the parts riding in tracks 24. This is an ideal condition since both faces of the strip are exposed to equal and uniform pressures along both face areas and there is, therefore, no tendency for all or part of the strip to be forced against a surface of a track 24. If, however, the depth of grooves 28 is too small, a slight difference in pressure between the upper and lower grooves may cause the strip to be pressed against a surface of a track 24 or a groove 28 and also may cause vibration and other instability in the strip. In such a case, the increased friction of the strip binding against the track surface, coupled with the vibration of the strip, causes it to hang up in chamber 14 and prevents ejection therefrom. If contact should be made with a surface of a groove 28, information may be destroyed. For the 5 mil strips, 60 p.s.i. applied pressure and other dimensions previously mentioned, a distance between walls 46 of .018 inch has been found to be satisfactory. When this distance is reduced below .018 inch instability immediately occurs.

To return a strip 10 to its storage chamber 14, the leading edge of the strip is fed into the chamber 14 by a suitable external feeding mechanism. At this time, air gun 32 is in its normal position (as shown in FIG. 1) with solenoid 30 energized and solenoid 40 deenergized. The vacuum which this arrangement develops in channel 30 (in a manner previously described) acts on the incoming strip to draw its leading edge into restricted portion 16 and to hold the member with its leading edge up against surface 44.

*Alternative embodiments*

Figure 5:
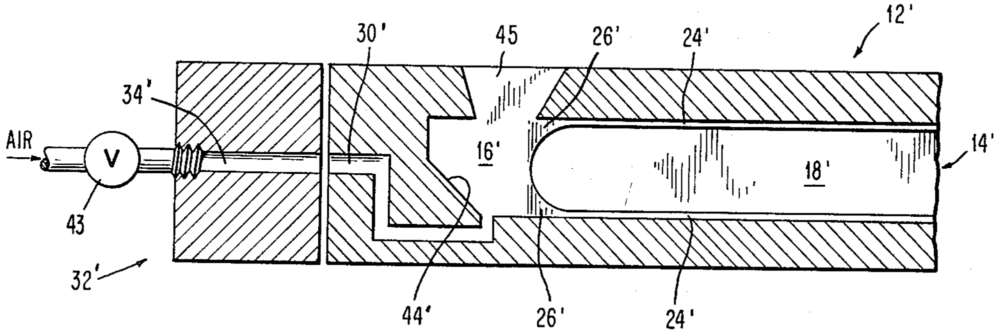
FIG. 5 is a top sectional view of an alternative embodiment of the invention.

FIG. 5 shows an alternative embodiment of the invention which embodiment permits the use of shallower grooves 28 and, therefore, for closer spacing between the members stored in bin 12. The principal differences between this embodiment of the invention and that shown in FIGS. 1–4 are (1) in this embodiment of the invention air pressure is applied through a channel 30′ to the side of restricted portion 16′ rather than to its rear; (2) a duct 45 is provided on the opposite side of portion 16′ to that which air pressure is applied; (3) air gun 32′ is stationary rather than movable and is supplied with air pressure through a normally-closed valve 43. The strip used with this embodiment of the invention has a 45° cut along the rear corner which is adjacent to the channel 30′ (the cut is such that the shape of the strip is the same as that of the chamber 14′).

In operation, the strip is initially driven into the restricted portion 16′ by some external drive means. Since it would be difficult to apply an effective vacuum to portion 16′ due to the exposure to atmosphere supplied by duct 45, the strip is fed into portion 16′ at low velocity so that little if any rebounding occurs when it strikes the rear surface 44′ of this portion.

Air pressure is then applied to channel 30′ by opening valve 43. This air cannot pass around the strip to escape either through duct 45 or forward portion 18′. There is, therefore, static pressure build-up behind the cut-edge of the strip, a component of this pressure being in the forward direction. The dynamic pressure supplied by the air applied to channel 30′ likewise has a component in the forward direction. These pressures combine to cause the strip to be blasted out of the chamber with a high velocity. When the strip reaches duct 45, the air behind the strip is allowed to escape through this duct. Since the strip is still in restricted portion 16′ at this time, there is a high resistance to air flow in the forward direction and the air flow is almost entirely through duct 45. This prevents any appreciable air flow over the faces of the strip thereby preventing vibration of the strip.

Since there is virtually no air flow in chamber 14 while the strip is moving therein, the spacing between walls 46′ is not as critical for this embodiment of the invention as it is for that previously described. This separation need only be great enough to prevent physical contact of the strip with walls 46′ due to slight vibration or normal sag in the strip.

While in FIG. 5, channel 30′ has been shown as connecting to the side of portion 16′ and a cut strip was used it is possible to use the vent 45 with a chamber 30 feeding into the rear of portion 16 as shown in FIG. 1 and with a square-cut strip. The vent 45 may also be positioned anywhere along the side of portion 16′, but higher velocity ejection is obtained when the vent is positioned at the forward end of portion 16′ as shown in FIG. 5.

Figure 6:
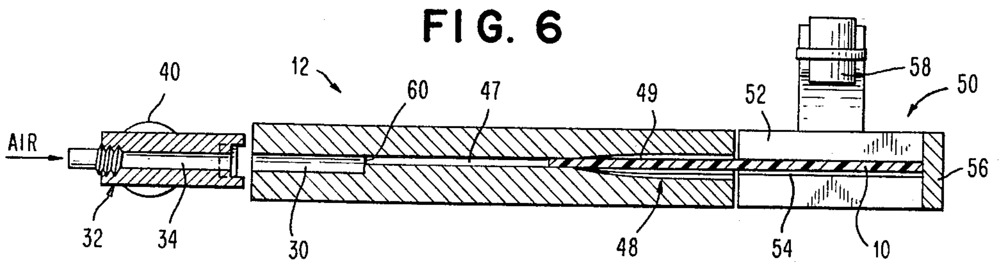
FIG. 6 is a sectional elevation of another alternative embodiment of the invention.

FIG. 6 shows a second alternative embodiment of the invention which embodiment eliminates the need for an external drive device to restore the strip to its storage chamber. To simplify the drawing, FIG. 6 shows bin 12 as having only one storage chamber 48, but it is to be understood that this storage bin may contain a plurality of storage chambers.

The chamber 48 for this embodiment of the invention differs from that previously described in that its restricted portion 47 is somewhat longer than the restricted portion 16 previously described. Portion 47 would, for a like applied pressure and a like strip have a width and thickness the same as those of portion 16. Forward portion 49 is, of course, shorter than portion 18 in FIGS. 1 and 2 but is otherwise of like dimensions.

Positioned behind bin 12 is an air gun 32 which is the same as, and performs the same function as, the air gun 32 previously described. Positioned in front of bin 12 in a position opposite to that of air gun 32 is a utilization station 50 having two rails 52 (only one of which is shown in FIG. 6). Each rail has a track 54 therein which track is of a depth and thickness similar to that of the tracks 24 in FIGS. 1–4. The rails are terminated by an end-stop member 56 which joins the rails 50 at their far end. A transducer element 58 is positioned midway between the two rails 52 in a position to act on the portion of the strip which is fed into the utilization station.

This embodiment of the invention operates in what will be referred to as a "stick-out-the-tongue" fashion. Air gun 32 is initially positioned to apply vacuum to channel 30 causing a strip which is partially in chamber portions 47 and 49 and partially in track 54 of utilization station 50 to be sucked completely into chamber 48 with its rear edge up against edge 60 of the chamber. When it is desired to eject the strip, solenoid 38 is deenergized and solenoid 40 energized to position air gun 32 to apply air pressure to channel 30. This causes strip 10 to be blasted out of chamber 48 in the same manner as a strip was previously blasted out of chamber 14; however, with this embodiment of the invention, the member hits against end-stop 56 before it completely leaves portion 47 and is stopped in the position shown in FIG. 5. The air pressure applied to channel 30 and portion 47 prevents the strip from rebounding when it hits end-stop 56. The close pressure fit in portion 47 prevents an appreciable amount of air from flowing over the faces of the strip and there is therefore no problem of instability in the member. The part of the record member in utilization station 50 is then acted upon by transducer 58. When the record member is no longer needed at the utilization station, solenoid 40 is deenergized and solenoid 38 energized to cause vacuum to be applied to channel 30 causing record member 10 to be drawn back into portion 47 in a manner previously described.

It should be emphasized that, while in the illustrative embodiments of the invention described above, the record member was a thin rectangular strip, the invention is not limited to the ejection of such a strip and may be used for the ejection of any flexible member. The record could, for example, be a magnetic or photographic disc or a member having some other geometric configuration. When, for example, the flexible member is a record disc, the only modification of the device which is required is to widen chamber 14, 14′ or 48 sufficiently to accommodate the disc.

Figure 7:
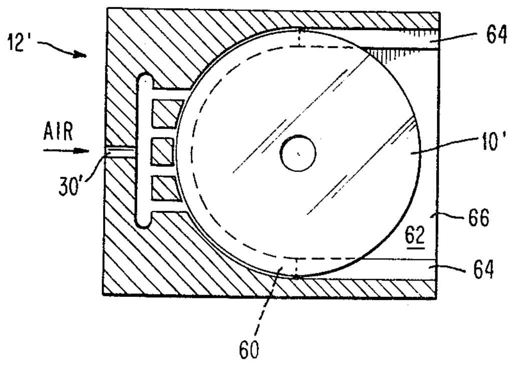
FIG. 7 is a top sectional view of still another alternative embodiment of the invention.

It should also be mentioned that, particularly where the record member is a disc or some other similar geometric configuration, to obtain the desired step-function pressure pulse at the member, it is necessary to apply the air pressure to the rear edge of the member through more than one input channel. For example, referring to FIG. 7, the record member 10' which is, in this case, a disc, is positioned with the rear half of its circumferential edge resting in a restricted track 60. Track 60 forms the rear portion of a disc-storage chamber 62. The remainder of the chamber is made up of the unrestricted portions of the track 64 and the grooves 66. Air pressure of vacuum is applied to the restricted tracks through a four pronged air channel 68. This arrangement applied the air pressure more uniformly along the rear edge of the disc.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A device for pneumatically ejecting a flexible record member without causing appreciable air flow across its faces comprising:
   a chamber having an upper and a lower surface which chamber is divided into two portions, a forward portion in which said surfaces are spaced by a distance sufficiently greater than the thickness of said record member to permit free movement of said member, and a rear portion in which said surfaces are so positioned and so spaced as to provide a close pressure fit with a rear portion of said record member;
   and means for applying air pressure to the rear of said chamber.

2. A device of the type described in claim 1 characterized by the inclusion of vent means near the front of said rear portion.

3. A device for pneumatically ejecting a flexible member comprising:
   means for applying gas under pressure to the rear of said member; and
   a chamber in which said member is supported, said chamber having an upper and a lower surface and being divided into two portions, a forward portion in which said upper and lower surfaces are spaced by a distance sufficiently greater than the thickness of said member to permit gas flow between the surfaces of said member and said upper and lower surfaces when said member is in said chamber, and a rear portion, the relative dimensions of which are such as to co-act with said member, when said member is in said chamber, to prevent sufficient gas flow between said member and the surfaces of said chamber to cause instability of said member.

4. A device of the type described in claim 3 characterized by the inclusion of:
   means for converting said pressure applying means to vacuum applying means whereby the rear portion of said member is drawn into the rear portion of said chamber without causing buckling of said member.

5. A device for pneumatically ejecting a flexible member comprising:
   a chamber in which said member is supported, said chamber having an upper and a lower surface and being divided into two portions, a forward portion in which said upper and lower surfaces are spaced by a distance sufficiently greater than the thickness of said member to permit gas flow between the surface of said member and said upper and lower surfaces when said member is in said chamber, and a rear portion, the relative dimensions of which are such that when said member is in said chamber, the rear portion of said chamber is effectively air tight; and
   means for applying gas under pressure to the rear of said chamber.

6. A device of the type described in claim 5 characterized by the inclusion of:
   means for converting said pressure applying means to vacuum applying means whereby the rear portion of said member is drawn into the rear portion of said chamber without causing buckling of said member.

7. A device for pneumatically ejecting a flexible member comprising:
   a chamber in which said member is supported, said chamber having an upper and a lower surface and being divided into two portions, a forward portion in which said upper and lower surfaces are spaced by a distance sufficiently greater than the thickness of said member to permit gas flow between the surfaces of said member and said upper and lower surfaces when said member is in said chamber, and a rear portion, the relative dimensions of which are such that, when said member is in said chamber, the rear portion of said chamber is effectively air tight, said chamber being tapered to provide a smooth transition between its two portions;
   means for applying gas under pressure to the rear of said chamber; and
   means for converting said pressure applying means to vacuum applying means whereby the rear portion of said member is drawn into the rear portion of said chamber without buckling.

8. Pneumatic storage and accessing apparatus for a flexible strip record member comprising:
   a chamber for storing said record member;
   said chamber having an upper and lower surface and opposing side surfaces and being divided into a first portion to which gas pressure is applied to move a record in said chamber, and a second portion having an opening for ingress and egress of a record member;
   said first portion having said surfaces spaced to co-act with a said record member in said chamber to form a substantially gas tight contact between said surfaces and said record member, and said first portion having a gas receiving port;
   said second portion having said surfaces spaced apart to permit gas flow between said surfaces and a record member when said record member extends into said second portion; and
   means for applying gas pressure to said port to move said record member.

9. The apparatus of claim 8 wherein said means for applying gas pressure to said port comprise means for applying positive pressure to eject said record from said chamber.

10. The apparatus of claim 8 wherein said means for applying gas pressure to said port comprises means for applying negative pressure to draw said record into said chamber.

11. The apparatus of claim 8 wherein said means for applying gas pressure to said port comprise means for applying positive and negative pressures selectively to respectively eject a record from and draw a record into said chamber.

12. The apparatus of claim 8 wherein said first portion contains a gas vent normally separated from said gas port by a said record in said chamber, said gas vent being operative to exhaust gas from said first portion of said chamber when said record has been ejected.

References Cited by the Examiner

UNITED STATES PATENTS 2,697,317 12/54 Stirn et al. ............ 302—2 X
2,904,215 9/59 Kohler ............ 221—278 X LOUIS J. DEMBO, *Primary Examiner.*